United States Patent [19]
Meidl et al.

[11] Patent Number: 5,302,288
[45] Date of Patent: Apr. 12, 1994

[54] TREATMENT OF HIGHLY COLORED WASTEWATERS

[75] Inventors: John A. Meidl; Thomas J. Vollstedt, both of Weston, Wis.

[73] Assignee: Zimpro Environmental, Inc., Rothschild, Wis.

[21] Appl. No.: 35,110

[22] Filed: Mar. 19, 1993

[51] Int. Cl.$^5$ .............................................. C02F 9/00
[52] U.S. Cl. ..................................... 210/616; 210/626; 210/631; 210/668; 210/669; 210/694; 210/756; 210/758; 210/759; 210/760
[58] Field of Search ............... 210/603, 605, 616, 624, 210/626, 631, 668, 669, 756, 758, 759, 760, 691, 694

[56] References Cited

U.S. PATENT DOCUMENTS

| | | | |
|---|---|---|---|
| 3,904,518 | 9/1975 | Hutton et al. | 210/616 |
| 4,069,148 | 1/1978 | Hutton et al. | 210/616 |
| 4,168,228 | 9/1979 | Mallatt et al. | 210/631 |
| 4,623,464 | 11/1986 | Ying et al. | 210/616 |
| 4,626,354 | 12/1986 | Hoffman et al. | 210/676 |
| 4,810,386 | 5/1989 | Copa et al. | 210/616 |
| 4,851,128 | 7/1989 | Rose | 210/669 |
| 4,857,198 | 8/1989 | Meidl | 210/631 |
| 4,897,196 | 1/1990 | Copa et al. | 210/616 |
| 4,919,815 | 4/1990 | Copa et al. | 210/603 |
| 4,956,093 | 9/1990 | Pirbazari et al. | 210/616 |
| 5,075,015 | 12/1991 | Kamke | 210/754 |

Primary Examiner—Christopher Upton
Attorney, Agent, or Firm—Tipton L. Randall

[57] ABSTRACT

The invention is a process for purifying wastewater containing organic and color-causing pollutants. The three unit processes include a first stage aerobic or anaerobic biophysical treatment, a second stage oxidizer treatment, and a third stage adsorbent contact treatment. The biophysical treatment removes the majority of the pollutants while the oxidizer treatment destroys residual organics and color-causing pollutants. The adsorbent contact treatment destroys any residual oxidizer in the wastewater and/or adsorbs any residual oxidation products. The preferred adsorbent is powdered activated carbon and the preferred oxidizer is some form of chlorine, e.g. sodium hypochlorite. The process may be operated in either a continuous flow mode or a batch flow mode.

34 Claims, 5 Drawing Sheets

TREATMENT OF HIGHLY COLORED WASTEWATERS

BACKGROUND OF THE INVENTION

1. Field of the Invention

This invention relates to a multi-step process for purifying wastewater containing organic and color-causing pollutants and more particularly to such processes including a biophysical treatment first stage, an oxidizer treatment second stage and an adsorbent contact treatment third stage.

2. Information Disclosure Statement

Wastewaters generated in the production and use of organic-based dyes present a most difficult treatment problem. These wastewaters contain organic substances which may be measured by the pollutant parameter chemical oxygen demand (COD). These organic substances render the wastewaters highly colored which makes them aesthetically unacceptable. The organic components are difficult to remove with adsorbents and are resistant to biological degradation as well. Treatment which removes the major portion of the organic substances, as measured by COD, may still result in a highly colored effluent. Applicants have discovered a unique and economical process to effectively treat these difficult wastewaters.

A particularly useful process for removing pollutants from wastewater employs a mixture of bacteria and powdered activated carbon in a treatment zone. This process, called the PACT ® treatment system, is disclosed by Hutton et al. in U.S. Pat. Nos. 3,904,518 and 4,069,148. The PACT treatment system operates as a continuous flow process with an aeration basin followed by a separate clarifier to separate biologically active solids and carbon from the treated wastewater, and the settled sludge is returned to the aeration basin.

Copa et al. in U.S. Pat. Nos. 4,810,386 and 4,897,196 disclose two-stage biophysical treatment systems for treatment of wastewaters. One operates in a continuous flow mode while the other operates in a batch mode. Complete settling of biophysical solids in the first stage is not required since the adsorbent contact second stage captures carried over solids.

Rose, in U.S. Pat. No. 4,851,128, discloses a process for decolorizing pulp mill wastewaters which contain color bodies. The wastewater is contacted with a carbon adsorbent which adsorbs the color bodies. After a time, the adsorbent is removed from use and heat treated to pyrolyze the adsorbed color bodies and regenerate the adsorbent for reuse. The wastewater may be preconditioned with a small amount of cationic flocculent to improve color removal.

Kamke, in U.S. Pat. No. 5,075,015 describes control of the color of a treatment system by removing color and oxidizable organic matter from thermally conditioned sludge liquor by treating the liquor with low dosage (250 to 430 mg/l) of chlorine which removes 20 to 70 percent of the color and produces a chlorine residual in the liquor.

Copa et al. in U.S. Pat. No. 4,919,815 disclose a two-stage process, including a biophysical anaerobic treatment stage followed by a biophysical aerobic treatment stage, for COD containing wastewaters.

SUMMARY OF THE INVENTION

The invention is a process for purifying wastewater containing organic and color-causing pollutants comprising the steps of providing a primary treatment zone, including an aeration zone and a quiescent zone, for treating the wastewater where wastewater is first introduced into the aeration zone. The wastewater is aerated in the aeration zone with an oxygen-containing gas in the presence of sufficient amounts of powdered adsorbent solids and biologically active solids to reduce the organic and color-causing pollutants to desired levels. The treated wastewater and solids are then transferred from the aeration zone to the quiescent zone and are retained in the quiescent zone for a sufficient time for solids to settle by gravity, producing a first settled solids phase and a first aqueous phase substantially free of solids.

The first aqueous phase is transferred from the primary treatment zone to an oxidizer contact zone where the aqueous phase contacts an oxidizer for a sufficient time to remove a further portion of the organic and/or color-causing pollutants. The aqueous phase from the oxidizer contact zone is transferred to an adsorbent contact zone where it contacts a powdered adsorbent for an agitation period sufficient to reduce the organic and color-causing pollutants to desired levels. Agitation ceases, allowing solids in the adsorbent-treated aqueous phase to settle by gravity for a settling period sufficient to produce a clarified, substantially solids-free, second aqueous phase and a second solids phase. The aqueous phase is separated and discharged to the environment or to further use.

In an alternative embodiment, the primary treatment zone comprises an anaerobic mixing zone and anaerobic quiescent zone for contacting the wastewater with powdered adsorbent solids and anaerobic biological solids to reduce the organic and color-causing pollutants to desired levels. After treatment in the mixing zone, the treated wastewater and solids are transferred from the mixing zone to the anaerobic quiescent zone and are retained in the quiescent zone for a sufficient time for solids to settle by gravity, producing a first settled solids phase and a first aqueous phase substantially free of solids.

The first aqueous phase is transferred from the primary treatment zone to an oxidizer contact zone and thence to an adsorbent contact zone for further treatment as described above.

The process may be operated in either a continuous flow mode or a batch flow mode. The preferred adsorbent is powdered activated carbon and the preferred oxidizer is some form of chlorine, e.g. sodium hypochlorite.

DESCRIPTION OF THE PREFERRED EMBODIMENTS

Figure 1:
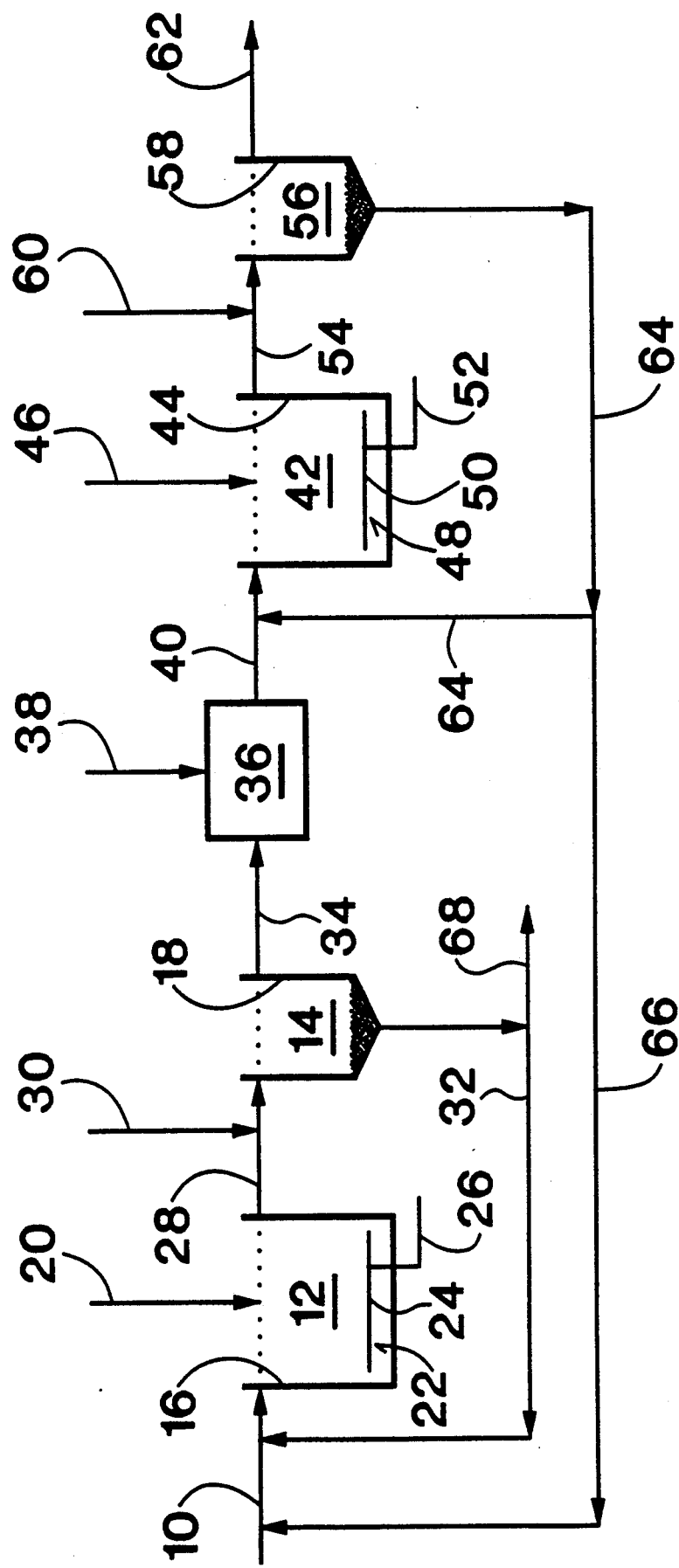
FIG. 1 is a flow diagram of a treatment system showing a continuous flow mode embodiment of the invention.

The process of the present invention may be operated in either a continuous flow mode or a batch flow mode. Either mod operates equally well and the choice of which mode to use will depend on the volume and strength of the wastewater, available capital and land space among other factors.

The continuous flow mode is first described with reference to FIG. 1. A highly colored wastewater flows via a conduit 10 into a primary treatment zone including an aeration zone 12 and a quiescent zone 14. The aeration zone 12 is contained within a tank 16 while the quiescent zone 14 is contained Within a clarifier tank 18. If the wastewater contains an excessive amount of solids, it can be clarified by settling, decantation or filtration to reduce the solids content prior to treatment in the primary treatment zone. The clarified or unclarified wastewater in the aeration zone 12 is continuously aerated with a pressurized oxygen-containing gas, such as air, in the presence of sufficient amounts of a powdered adsorbent and biologically active solids to reduce the organic and color-causing pollutants to desired levels. The operating conditions for and the additives present in the aeration zone 12 can be the same as described in Hutton et al, U.S. Pat. Nos. 3,904,518 and 4,069,148 which are incorporated herein by reference.

The adsorbent must be finely divided and readily dispersible in an aqueous medium. Various adsorbents useful in purifying wastewaters can be used. Suitable adsorbents include powdered activated carbon, fuller's earth, diatomaceous earth, fly ash, coke breeze, etc., with powdered activated carbon being preferred. The adsorbent can be added to the aeration zone 12 in any suitable manner, for example, as an aqueous slurry introduced through a conduit 20.

The amount of adsorbent present in the aeration zone 12 varies, depending primarily on the nature of the wastewater and the degree of treatment desired. Generally, this amount usually is about 25 to about 20,000 milligrams of adsorbent per liter of wastewater.

The biologically active solids present in the aeration zone 12 are suspended solids containing different types of bacteria formed by contacting wastewater, bacteria and oxygen. They can be activated sludge or activated solids found in oxidation ponds or other biological treatment processes. Generally, the amount of biologically active solids present in the aeration zone provides a total suspended solids concentration (both adsorbent and biologically active solids) of about 50 to about 50,000 parts per million of wastewater.

The adsorbent and biologically active solids (mixed liquor solids) are continuously mixed with the wastewater by an oxygen-containing gas, such as air, introduced into the aeration zone 12 by an aeration system 22 including a sparger 24 to which pressurized oxygen-containing gas is supplied by a conduit 26. Other suitable aeration distribution means which cause dissolution of oxygen in the mixture and produces agitation can be used. Also, this aeration may be supplemented by mechanical stirring means. The reaction or hydraulic detention time (HDT) for the wastewater in the aeration zone 12 varies, depending primarily upon waste strength and the degree of treatment required. The flow rates of the incoming wastewater and other materials introduced into the aeration zone 12 are adjusted to provide an HDT within the range of about 0.5 hours up to as much as 14 days.

The aerated wastewater containing suspended adsorbent and biologically active solids passes from the aeration zone 12 via a conduit 28 to the quiescent zone 14 within the clarifier tank 18. The quiescent zone 14 is sized to retain the treated wastewater therein for a time sufficient to permit the suspended solids to settle by gravity to produce a first settled solids phase and a first aqueous phase substantially free of solids. Any solids present in the aqueous phase will consume oxidizer in the following treatment step and impair the effectiveness of the oxidation treatment. The settling of solids in the clarifier may be accelerated by adding a flocculation aid via a conduit 30 as the mixture passes through the conduit 28. While various flocculent aids can be used, cationic polymers, such as Nalco's 7139 or Nalco's 7147 marketed by Nalco Chemical Co., Naperville, Ill., are preferred. These materials are high molecular weight cationic copolymers. The amount of flocculent aid added is sufficient to promote the desired settling of the solids. Generally, this amount is about 0.1 to about 10 milligrams of flocculent aid per liter of partially treated wastewater.

The settled solids phase in the quiescent zone 14 is returned via a recycle conduit 32 to the influent conduit 10 and thence to the aeration zone 12 in order to maintain the desired solids concentration therein.

The partially treated wastewater in the quiescent zone 14 has had a significant portion of the organic and color-causing pollutants removed. However, there remains a portion of these pollutants which require further treatment. This first aqueous phase is transferred via a conduit 34 to an oxidizer contact zone 36 where the wastewater contacts an oxidizer to remove additional portions of color-causing pollutants. The oxidizer may be a chlorine-based oxidizer, such as chlorine gas or sodium hypochlorite (NaOCl). Other oxidizers include potassium permanganate, hydrogen peroxide or ozone. The preferred oxidizer is sodium hypochlorite solution, commonly known as bleach. The bleach solution is added via a conduit 38 to the oxidizer contact zone 36 to remove organic and color-causing pollutants from the wastewater. For the liquid oxidizers, such as bleach or hydrogen peroxide, the oxidizer contact zone need be only a mixing tank which provides sufficient contact time between the oxidizer solution and wastewater. The gaseous oxidizers, such as chlorine gas or ozone, require a more elaborate device for transferring these gaseous oxidizers to the wastewater to bring about the desired color and organics removal. These gas transfer devices are well known in the industry and are commercially available. The dose of the preferred oxidizer, NaOCl, to the wastewater can range from about 50 mg/l to about 15,000 mg/l. The other oxidizers are also employed at this dose rate.

The oxidizer produces a residual in the wastewater which requires removal before the wastewater is released to the environment or to further use. In the case of $Cl_2$ or NaOCl, a chlorine residual is produced. In addition, there may be chlorinated organics produced in the decolorizing treatment. Applicants have found that contacting the decolorized wastewater with a powdered adsorbent, such as powdered activated carbon, removes the chlorine residual and adsorbs any chlorinated organics formed in the decolorizing treatment.

The oxidized wastewater flows from the oxidizer contactor 36 via a conduit 40 to an adsorbent contact zone 42 contained within a tank 44. Fresh powdered adsorbent, preferably the same as that used in primary treatment zone (e.g., activated carbon), is introduced via a conduit 46 into the contact zone where it mixes with the oxidized wastewater from the conduit 40 by a suitable agitation means. While the agitation means can be a mechanical stirring means, in the specific embodiment illustrated it is an aeration system 48, which can be similar to the one used in the aeration zone 12, including a sparger 50 to which a pressurized gas is supplied though a conduit 52. The gas need not contain oxygen since the oxidizer residual, such as chlorine, kills any biologically active solids present. However, air is generally the least expensive gas. The adsorbent contacts the wastewater in zone 42 to remove residual oxidizer and adsorb any halogenated organics formed in the oxidation step. The concentration of adsorbent in the contact zone can range from about 50 mg/l to about 50,000 mg/l.

The adsorbent contactor tank 44 is sized so that the oxidized wastewater passing through that tank contacts adsorbent for a specified contact time period. The mixture of oxidized wastewater and adsorbent then flows via a conduit 54 to a second quiescent zone 56 within a clarifier tank 58. A settling aid, such as the cationic polymer described earlier, is added to the mixture via a conduit 60 to aid in settling of solids. Removed from the agitation in the contact zone 42, this mixture settles by gravity for a period sufficient to produce a substantially solids-free aqueous phase and a settled adsorbent phase. The treated aqueous phase overflows the clarifier tank 58 and is discharged via a conduit 62 to the environment or to further use. The settled adsorbent solids phase is continuously recycled from the bottom of the clarifier tank 58, via a conduit 64, to the inlet of the adsorbent contact zone 42 to maintain the desired adsorbent concentration therein.

As fresh adsorbent is added to the adsorbent contact zone 42 to maintain the quality of the effluent, adsorbent accumulates within the contact zone 42 and the quiescent zone 56. To control the adsorbent solids therein, a portion of the settled solids phase from the clarifier return line 64 may be transferred to the inlet of the primary treatment zone, via a conduit 66, and added to the solids in the aeration zone 12. To control solids within the aeration zone, a portion of the settled solids phase from the first clarifier tank 18 can be withdrawn via a conduit 68 and sent to dewatering or other disposal means.

The batch flow mode of operation for the present invention is now described with reference to FIG. 2. Rather than a continuous flow through the system, the wastewater moves from one treatment zone to the next in discrete batches. The components common to those illustrated in FIG. 1 are designated with the same reference numeral in FIG. 2.

A preselected volume of clarified or unclarified wastewater is introduced via a conduit 10 into a primary treatment zone 11 contained within a tank 16. This is termed the "fill" step of the batch sequence. The primary treatment zone comprises both an aeration zone and a quiescent zone when operated in the batch flow mode. The tank 16 is fitted with an aeration system 22 including a sparger 24 to which pressurized oxygen-containing gas is supplied by a conduit 26. Once in the tank 16, the wastewater is aerated by the aeration system 22 in the presence of sufficient amounts of powdered adsorbent solids and biologically active solids to reduce the organic and color-causing pollutants to desired levels. The operating conditions, the nature of the adsorbent and the amounts of adsorbent and biological solids present in the aeration zone are as described for FIG. 1 above. Fresh adsorbent may be added to the tank 16 via a conduit 20 to supplement that lost from the process.

After a preselected "react" period, agitation and aeration ceases by stopping aeration within the tank 16 with oxygen-containing gas. Shortly before ceasing the aeration, a flocculent aid, such as the cationic polymer described earlier, may be added to the aerating mixture to assist in solids settling. Ceasing of aeration converts the tank 16 to a quiescent settling zone where liquid separates from solids. This is termed the "settle" step. Settling continues within the primary treatment zone until a first settled solids phase forms and a first clarified liquid phase accumulates. Solids carried to the oxidizer contact step should be minimized to maintain the effectiveness of the oxidizer treatment. The partially treated wastewater of the first aqueous phase is transferred via a conduit 34 to an oxidizer contact zone 36. This is termed the "decant" step in the batch mode of operation. The settled solids phase within the tank 16 remains therein and is used to treat the next batch of wastewater which now fills the tank. The batch sequence of steps is then repeated for the primary treatment zone.

Within the oxidizer contact zone 36, the batch of wastewater contacts an oxidizer to remove additional portions of color-causing pollutants. The oxidizer may be a chlorine-based oxidizer such as chlorine gas or sodium hypochlorite (NaOCl), or oxygen-based such as potassium permanganate, hydrogen peroxide or ozone. The preferred oxidizer is sodium hypochlorite solution, commonly known as bleach. The bleach solution is added via a conduit 38 to the oxidizer contact zone 36 to remove organic and color-causing pollutants from the wastewater. For the liquid oxidizers, such as bleach or hydrogen peroxide, the oxidizer zone need be only a mixing tank which provides sufficient contact time between the oxidizer solution and the batch of wastewater. The gaseous oxidizers, such as chlorine gas or ozone, require a more elaborate device for transferring these gaseous oxidizers to the wastewater to bring about the desired color and organics removal. These devices are well known in the industry and are commercially available. The dose of the preferred oxidizer, NaOCl, to the wastewater can range from about 50 mg/l to about 15,000 mg/l.

The oxidizer produces a residual in the wastewater which requires removal before the wastewater is released to the environment or to further use. In the case of NaOCl, a chlorine residual is produced. In addition, there may be chlorinated organics produced in the decolorizing treatment. As described above, contacting the decolorized wastewater with a powdered adsorbent, such as powdered activated carbon, removes the chlorine residual and adsorbs any chlorinated organics formed in decolorizing.

The batch of oxidized wastewater flows from the oxidizer contactor 36 via a conduit 40 to an adsorbent contact zone 43 contained within a tank 44. Fresh powdered adsorbent, preferably the same as that used in primary treatment zone (e.g., activated carbon), is introduced via a conduit 46 into the contact zone where it mixes with the oxidized wastewater from the conduit 40 by a suitable agitation means. While the agitation means can be a mechanical stirring means, in the specific embodiment illustrated, it is an aeration system 48, which can be similar to the one used in the aeration zone 12, including a sparger 50 to which a pressurized gas is supplied though a conduit 52. The gas need not contain oxygen since the oxidizer residual, such as chlorine, kills any biologically active solids present. The adsorbent contacts the batch of wastewater in contact zone 43 to remove residual oxidizer and adsorb any halogenated organics formed in the oxidation step. The concentration of adsorbent in the contact zone may range from about 50 to about 50,000 mg/l.

The sequence of steps performed in adsorbent contact zone are "fill", "react", "settle" and "decant" as described for the primary treatment zone. The react step proceeds with agitation to contact the powdered adsorbent with the wastewater. A flocculent aid, such as the cationic polymer described earlier, is added to zone 43 just prior to ceasing of agitation to assist in the settling of solids. The settling step produces a clarified, substantially solids-free, second aqueous phase and a second settled solids phase of adsorbent particles. The aqueous phase is decanted from the solids phase via a conduit 62 and discharged to the environment or to further use. The settled solids phase of adsorbent is retained within the tank 43 to treat additional batches of oxidized wastewater.

As additional adsorbent is added to the adsorbent contact zone 43, some accumulation of solids occurs. These solids are controlled by transferring a portion of the settled solids phase via a conduit 66 to the inlet of the primary treatment zone to supplement adsorbent therein. The solids within the primary treatment zone are controlled by sending a portion of them to waste via a conduit 68 connected to the tank 16.

As mentioned above, the treatment steps in the primary treatment zone and adsorbent contact zone for this batch mode embodiment of the invention occur sequentially within the same space, and the oxidation of wastewater in the oxidizer contact zone occurs intermittently. This is in contrast to the continuous flow mode of operation where all steps occur continuously and simultaneously.

An alternative embodiment of the invention is now described where a first stage anaerobic biophysical treatment is employed. It may be more economical to first treat a high strength highly, colored wastewater in a primary treatment zone by an anaerobic biophysical process to remove a majority of the COD. Alternatively, some wastewaters are simply more amenable to treatment by an anaerobic process. In this alternative embodiment, the anaerobically treated wastewater is then treated with an oxidizer followed by an adsorbent contact step, as described above for the aerobically treated first stage wastewater, to produce a highly treated effluent.

Figure 2:
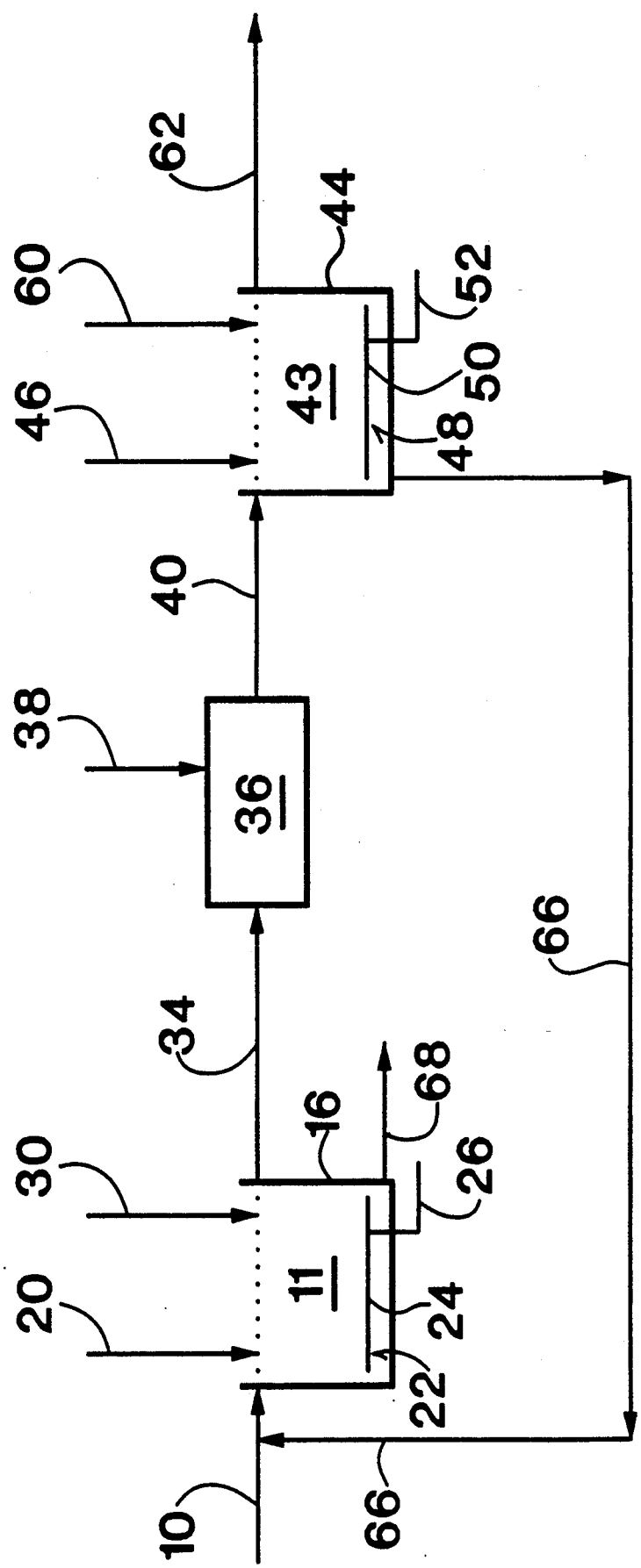
FIG. 2 is a flow diagram of a treatment system showing a batch flow mode embodiment of the invention.
Figure 3:
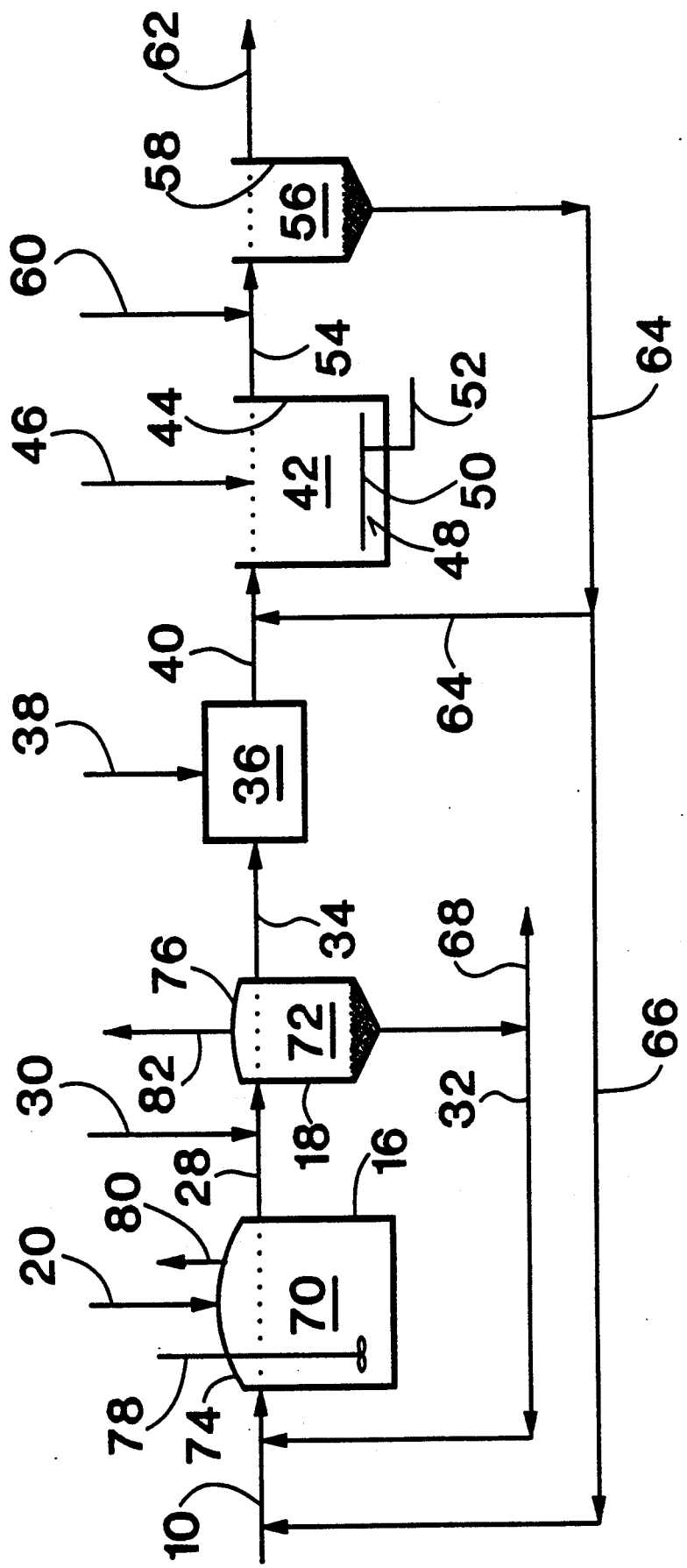
FIG. 3 is a flow diagram of a treatment system showing a continuous flow mode of an alternative embodiment of the invention.
Figure 4:
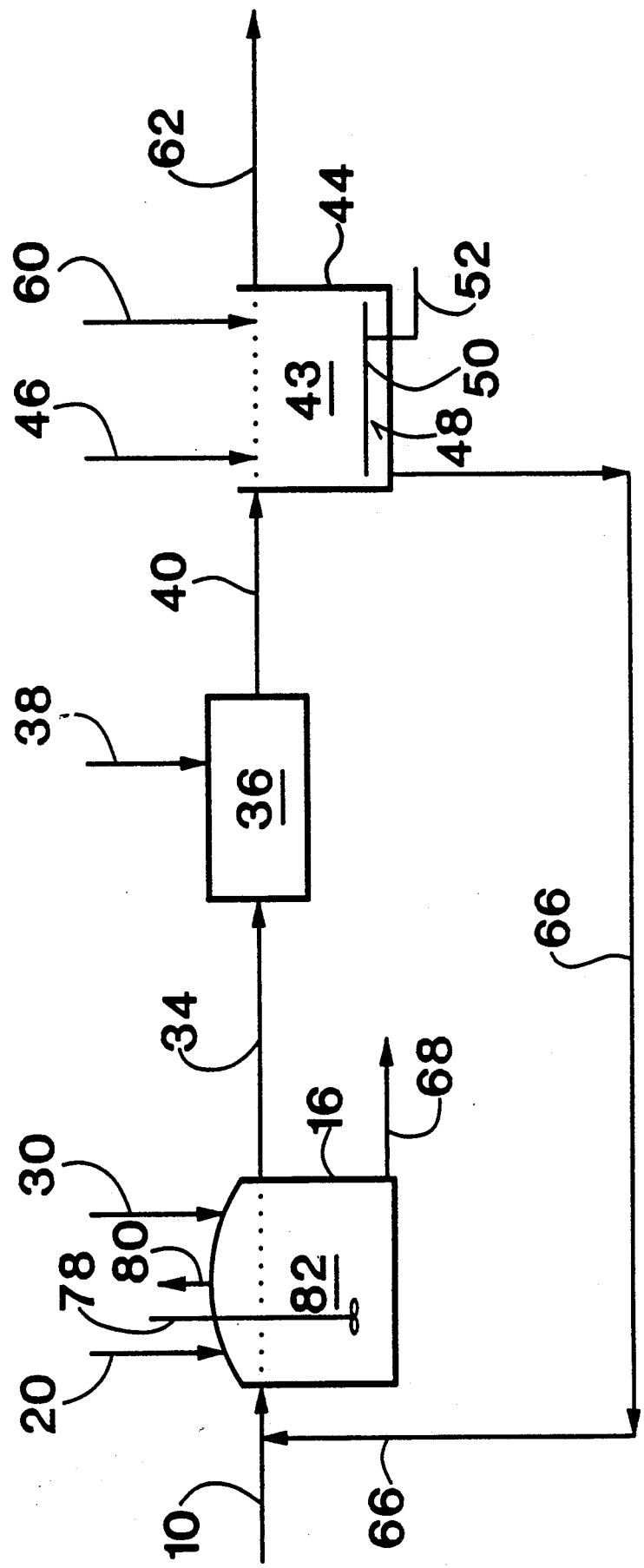
FIG. 4 is a flow diagram of a treatment system showing a batch flow mode of an alternative embodiment of the invention.

The substitution of an anaerobic biophysical process for the aerobic biophysical process in the primary treatment zone is shown in FIGS. 3 and 4. As described above, the whole process may be operated in either a continuous flow mode, FIG. 3, or a batch flow mode, FIG. 4. The components common to those illustrated in FIGS. 1 and 2 are designated with the same reference numerals in FIGS. 3 and 4.

Referring to FIG. 3, a highly colored, organic pollutant containing wastewater flows via a conduit 10 into a primary treatment zone including an anaerobic mixing zone 70 and an anaerobic quiescent zone 72. The anaerobic mixing zone 70 is contained within a tank 16 while the quiescent zone 72 is contained within a clarifier tank 18. The mixing tank 16 and the clarifier tank 18 are fitted with covers, 74 and 76 respectively, to exclude atmospheric oxygen and collect the methane gas produced by the anaerobic microorganisms. The clarified or unclarified wastewater in the anaerobic mixing zone 70 is continuously mixed by a mixing means 78, such as a blade mixer, inert gas diffuser or similar device, in the presence of sufficient amounts of a powdered adsorbent and biologically active anaerobic solids to reduce the organic and color-causing pollutants to desired levels.

The adsorbent must be finely divided and readily dispersible in an aqueous medium. Various adsorbents useful in purifying wastewaters can be used. Suitable adsorbents include powdered activated carbon, fuller's earth, diatomaceous earth, fly ash, coke breeze, etc., with powdered activated carbon being preferred. The adsorbent can be added to the anaerobic mixing zone 70 in any suitable manner, for example, as an aqueous slurry introduced through a conduit 20.

The amount of adsorbent present in the anaerobic mixing zone 70 varies, depending primarily on the nature of the wastewater and the degree of treatment desired. Generally, this amount usually is about 25 to about 20,000 milligrams of adsorbent per liter of wastewater.

The biologically active anaerobic solids present in the anaerobic mixing zone 70 are suspended solids containing different types of bacteria formed by contacting wastewater and bacteria under anaerobic conditions. Generally, the amount of biologically active anaerobic solids present in the anaerobic zone provides a total suspended solids concentration (both adsorbent and biological solids) of about 50 to about 50,000 parts per million of wastewater.

The adsorbent and biologically active anaerobic solids (mixed liquor solids) are continuously mixed with the wastewater by the mechanical mixing means 78 described above. The methane gas generated is vented via a gas conduit 80 in the tank cover 74 and may be used as a fuel.

The reaction or hydraulic detention time (HDT) for the wastewater in the anaerobic zone 70 varies, depending primarily upon waste strength and the degree of treatment required. The flow rates of the incoming wastewater and other materials introduced into the anaerobic zone 70 are adjusted to provide an HDT within the range of about 0.5 hours up to as much as 14 days.

The wastewater containing suspended adsorbent and biologically active anaerobic solids passes from the anaerobic mixing zone 70 via a conduit 28 to the quiescent zone 72 within the clarifier tank 18 also fitted with a gas conduit 82 to collect the methane generated for use as a fuel. The quiescent zone 72 is sized to retain the treated wastewater therein for a time sufficient to permit the suspended solids to settle by gravity to produce a first settled solids phase and a first aqueous phase substantially free of solids. Any solids present in the aqueous phase will consume oxidizer in the following treatment step and impair the effectiveness of the oxidation treatment. The settling of solids in the clarifier may be accelerated by adding a flocculation aid via a conduit 30 as the mixture passes through the conduit 28. While various flocculent aids can be used, cationic polymers, such as Nalco's 7139 or Nalco's 7147 marketed by Nalco Chemical Co., Naperville, Ill., are preferred. These materials are high molecular weight cationic copolymers. The amount of flocculent aid added is sufficient to promote the desired settling of the solids. Generally, this amount is about 0.1 to about 10 milligrams of flocculent aid per liter of partially treated wastewater.

The settled solids phase in the quiescent zone 72 is returned via a recycle conduit 32 to the influent conduit 10 and thence to the anaerobic mixing zone 70 in order to maintain the desired solids concentration therein.

The partially treated wastewater in the quiescent zone 14 has had a significant portion of the organic and color-causing pollutants removed. However, there remains a portion of these pollutants which require further treatment. This first aqueous phase is transferred via a conduit 34 to an oxidizer contact zone 36 where the wastewater contacts an oxidizer to remove additional portions of color-causing pollutants. The oxidizer may be a chlorine-based oxidizer, such as chlorine gas or sodium hypochlorite (NaOCl). Other oxidizers include potassium permanganate, hydrogen peroxide or ozone. The preferred oxidizer is sodium hypochlorite solution, commonly known as bleach, and the dosage for any of the oxidizers is about 50 mg/l to about 15,000 mg/l.

The remainder of the continuous flow treatment process is as described for FIG. 1 above. At least a portion of adsorbent from the adsorbent clarifier recycle line 64 is transferred to the influent conduit 10 via a conduit 66. Excess solids are removed from the anaerobic primary treatment zone via a conduit 68 to control solids concentration within the system.

Figure 3A:
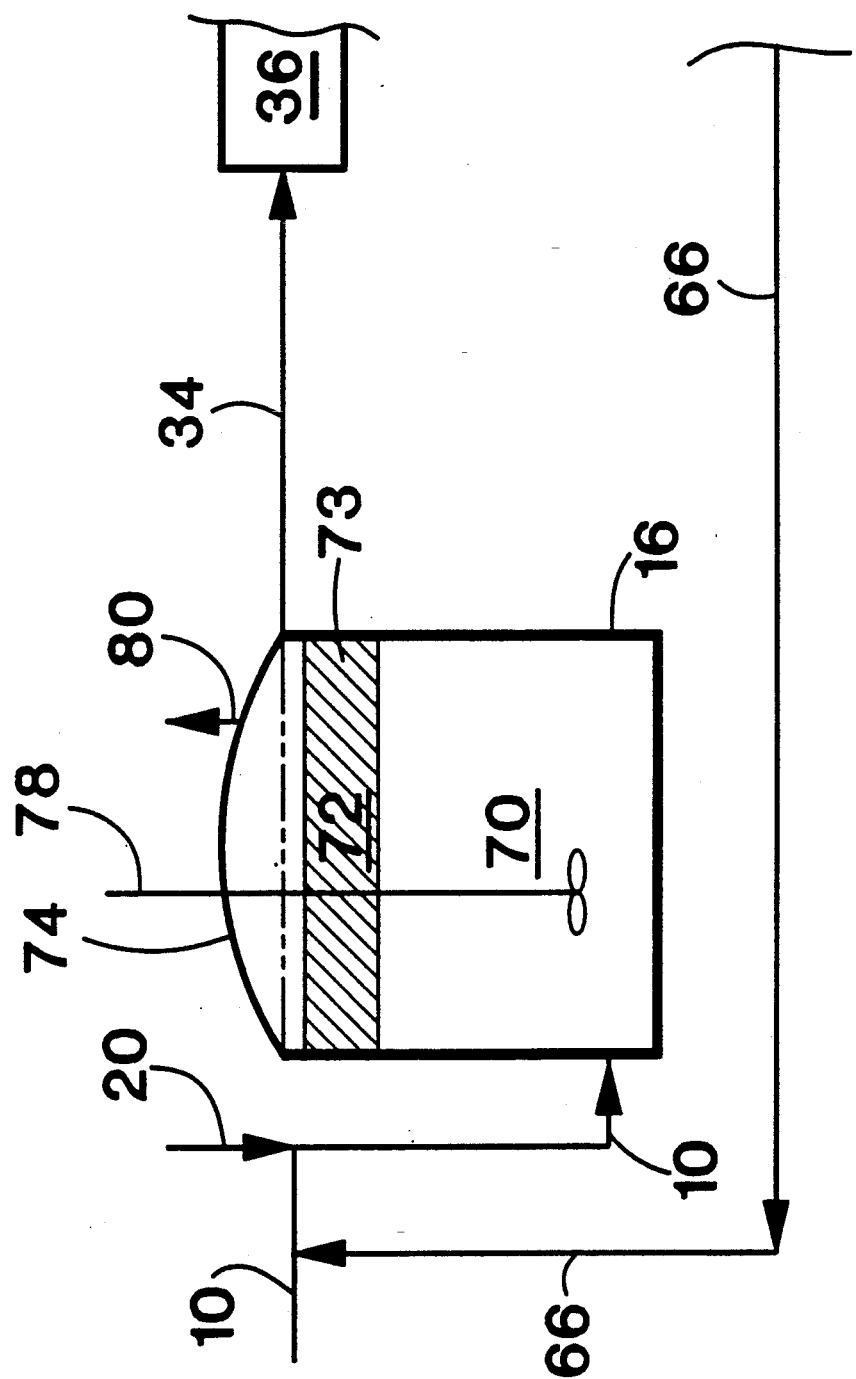
FIG. 3a is a flow diagram of a treatment system showing a continuous flow mode of an alternative embodiment of the invention.

An alternative configuration for the anaerobic biophysical treatment portion of the continuous flow mode system of operation is shown in FIG. 3a. In this embodiment the primary treatment zone is contained within a single covered tank 16 with a lower anaerobic mixing zone 70 and an upper anaerobic quiescent zone 72 to separate solids. The wastewater first enters the lower mixing zone 70 to contact anaerobic biological solids and powdered adsorbent. In this configuration a packing bed 73 provides the quiescent zone 72 where solids separated from the mixed anaerobic liquid fall, under the force of gravity, back to the mixing zone 70, while the clarified liquid flows via an upper conduit 34 to receive further treatment in the oxidizer contact zone 36. No polymer is needed to settle anaerobic biosolids and powdered adsorbent in this embodiment of the invention. All gases generated in the primary anaerobic treatment zone are collected and removed via a single conduit so The remainder of the treatment system operates in a continuous flow mode as described for FIG. 3 above. Any powdered adsorbent (conduit 20) or recycled solids (conduit 66) enter the primary treatment zone via the influent wastewater conduit 10.

Referring to FIG. 4, a batch flow mode of operation is described. A preselected volume of clarified or unclarified wastewater is introduced via a conduit 10 into a primary treatment zone 82 contained within a tank 16 fitted with a cover 74 to exclude atmospheric oxygen and collect the methane gas produced by the anaerobic microorganisms. This is termed the "fill" step of the batch sequence. The primary treatment zone comprises both an anaerobic mixing zone and an anaerobic quiescent settling zone when operated in the batch flow mode. The tank 16 is fitted with an mixing means 78 such as a blade mixer, inert gas diffuser or similar device. Once in the tank 16, the wastewater is mixed by the mixing means 78 in the presence of sufficient amounts of powdered adsorbent solids and biologically active anaerobic solids to reduce the organic and color-causing pollutants to desired levels. The methane gas generated is removed via a gas conduit so in the tank cover 74 for use as a fuel. The operating conditions, the nature of the adsorbent and the amounts of adsorbent and anaerobic biological solids present in the anaerobic zone are as described for FIG. 3 above. Fresh adsorbent may be added to the tank 16 via a conduit 20 to supplement that lost from the process.

After a preselected "react" period, agitation ceases by discontinuing mixing with the mixing means 78. Shortly before ceasing the mixing, a flocculent aid, such as the cationic polymer described earlier, may be added to the mixture to assist in solids settling. Ceasing of mixing converts the tank 16 to a quiescent settling zone where liquid separates from solids. This is termed the "settle" step. Settling continues within the primary treatment zone until a first settled solids phase forms and a first clarified liquid phase accumulates. Solids carried to the oxidizer contact step should be minimized to maintain the effectiveness of the oxidizer treatment. The partially treated wastewater of the first aqueous phase is transferred via a conduit 34 to an oxidizer contact zone 36. This is termed the "decant" step in the batch mode of operation. The settled solids phase within the tank 16 remains therein and is used to treat the next batch of wastewater which now fills the tank. The batch sequence of steps is then repeated for the primary treatment zone.

The remainder of the batch flow treatment process is as described for FIG. 2 above. Adsorbent from the adsorbent contact zone 43 is transferred to the influent conduit 10 via a conduit 66. Excess solids are removed from the anaerobic primary treatment zone 82 via a conduit 68 to control solids concentration within the system.

As mentioned above, the treatment steps in the primary treatment zone and adsorbent contact zone for this batch mode embodiment of the invention occur sequentially within the same space, and the oxidation of wastewater in the oxidizer contact zone occurs intermittently. This is in contrast to the continuous flow mode of operation where all steps occur continuously and simultaneously.

EXAMPLE

Two continuous flow bench-scale two-stage systems in essentially the flow scheme shown in FIG. 1 were used to provide treatment for wastewater from a dye production facility. The dye wastewater is produced on a batch process basis and the characteristics of each batch of wastewater varies significantly. Barrels of wastewater from various batches were used as feed for the two bench-scale treatment trains. One treatment train was operated without the oxidizer treatment between the first stage aerobic biophysical treatment and the second stage adsorbent contact treatment for comparison purposes. The two trains were operated with a ten day solids residence time in the first stage and five day solids residence time in the second stage. The hydraulic detention times were two and one days for the first and second stages respectively. Powdered activated carbon was used as the adsorbent for both systems. Sufficient fresh carbon was added daily to each carbon contact zone to provide the dose shown in Table 1 below. To maintain the desired carbon concentration in each contact zone, a portion of the used carbon was removed and transferred to the aeration zone of the first stage. Likewise, a portion of biological solids and carbon were wasted daily from each first stage to control solids concentration therein. The oxidizer used to treat the first stage effluent was a solution of sodium hypochlorite. The dosage of this oxidizer is also shown in Table 1. Effluent from the first and second stages were analyzed for biological oxygen demand ($BOD_5$), chemical oxygen demand ($COD_{Mn}$) and for color (APHA units). The percent removals for each of these parameters is shown in Table 1.

Single stage treatment removed nearly all the biodegradable components in the dye wastewater as shown by the $BOD_5$ measurements. However, significant COD and color remained in the first stage effluent. Direct treatment by carbon contact only (no NaOCl) removed a small portion of the COD and color as shown for batch numbers 1, 2, and 4 below. Treatment of the first stage effluent with the oxidizer sodium hypochlorite, at a dosage of 1,000 to 5,000 mg/l, followed by carbon contact in the second stage resulted in significantly better removals of COD and color in the second stage effluent as shown for batch numbers 4, 6, 7, and 10–12 in Table 1. Higher doses of carbon and sodium hypochlorite provided the best treatment as expected, even with the high variability of the dye wastewater.

From the foregoing description, one skilled in the art can easily ascertain the essential characteristics of the invention and, without departing from the spirit and scope thereof, make various changes and modifications to adapt it to various usages.

TABLE 1

Bench-Scale Treatment of Dye Wastewater

| Batch Number | Carbon Dose, mg/l | NaOCl Dose, mg/l | Analysis | % Removal Stage 1 | % Removal Stage 2 |
|---|---|---|---|---|---|
| 1 | 1,000 | 0 | $BOD_5$ | 94.7 | >99.7 |
|  |  |  | $COD_{Mn}$ | 57.1 | 57.1 |
|  |  |  | Color | 22.7 | 45.5 |
| 2 | 2,000 | 0 | $BOD_5$ | >99.7 | >99.37 |
|  |  |  | $COD_{Mn}$ | 52.7 | 66.7 |
|  |  |  | Color | 3.3 | 43.3 |
| 4 | 3,500 | 0 | $BOD_5$ | 98.3 | >98.5 |
|  |  |  | $COD_{Mn}$ | 16.6 | 41.7 |
|  |  |  | Color | 0 | 24.1 |
| 4 | 2,000 | 1,000 | $BOD_5$ | >98.5 | >98.5 |
|  |  |  | $COD_{Mn}$ | 33.3 | 70.8 |
|  |  |  | Color | 3.4 | 82.7 |
| 6 | 2,000 | 2,400 | $BOD_5$ | 98.0 | >98.5 |
|  |  |  | $COD_{Mn}$ | 54.2 | 87.5 |
|  |  |  | Color | 22.2 | 98.33 |
| 6 | 3,000 | 3,500 | $BOD_5$ | 97.5 | >98.5 |
|  |  |  | $COD_{Mn}$ | 54.5 | 82.7 |
|  |  |  | Color | 44.4 | 98.8 |
| 7 | 2,000 | 2,400 | $BOD_5$ | 98.6 | >98.8 |
|  |  |  | $COD_{Mn}$ | 20.0 | 60.0 |
|  |  |  | Color | 10.3 | 96.6 |
| 7 | 5,000 | 5,000 | $BOD_5$ | >98.8 | >98.8 |
|  |  |  | $COD_{Mn}$ | 30.0 | 80.0 |
|  |  |  | Color | 17.2 | 97.9 |
| 10 | 7,500 | 5,000 | $BOD_5$ | 99.3 | >99.5 |
|  |  |  | $COD_{Mn}$ | 46.9 | 81.3 |
|  |  |  | Color | 45.3 | 97.8 |
| 11 | 7,500 | 5,000 | $BOD_5$ | >99.3 | >99.3 |
|  |  |  | $COD_{Mn}$ | 7.9 | 84.9 |
|  |  |  | Color | 45.3 | 96.8 |
| 12 | 7,500 | 5,000 | $BOD_5$ | >99.4 | >99.4 |
|  |  |  | $COD_{Mn}$ | 63.6 | 68.2 |
|  |  |  | Color | 34.3 | 95.0 |

We claim:

1. A process for purifying wastewater containing organic and color-causing pollutants comprising the steps:
   (a) providing a primary aerobic treatment zone including an aeration zone and a quiescent zone for treating the wastewater;
   (b) introducing wastewater into said aeration zone;
   (c) aerating the wastewater in said aeration zone with an oxygen-containing gas in the presence of sufficient amounts of powdered adsorbent solids and biologically active aerobic solids to reduce the organic and color-causing pollutants to desired levels, said thus-treated wastewater and solids transferred from said aeration zone to said quiescent zone;
   (d) retaining said thus-treated wastewater and solids in the quiescent zone for a sufficient time for solids therein to settle by gravity and produce a first settled solids phase and a first aqueous phase substantially free of solids;
   (e) transferring said first aqueous phase from said primary treatment zone to an oxidizer contact zone;
   (f) contacting said first aqueous phase with a chemical oxidizer in the oxidizer contact zone for a sufficient time to remove a further portion of said organic and color-causing pollutants;
   (g) transferring said thus-treated aqueous phase from the oxidizer contact zone to an adsorbent contact zone;
   (h) agitating said thus-treated aqueous phase in the adsorbent contact zone in the presence of powdered adsorbent solids for an agitation period sufficient to further reduce the organic and color-causing pollutants to desired levels;
   (i) terminating agitation and allowing adsorbent solids in said adsorbent-treated aqueous phase to settle by gravity for a settling period sufficient to produce a clarified, substantially solids-free, second aqueous phase and a second solids phase; and
   (j) separating said second aqueous phase from said second solids phase and discharging said second aqueous phase to the environment or to further use.

2. A process according to claim 1 wherein said process operates in a continuous flow mode wherein
   said aeration of wastewater of step (c) and said solids settling in quiescent zone of step (d) occurs continuously and simultaneously;
   said oxidizing of wastewater of step (f) occurs continuously;
   and said agitating of wastewater and adsorbent of step (h), settling of step (i), and separating of step (j) occurs continuously and simultaneously.

3. A process according to claim 1 wherein said process operates in a batch flow mode wherein
   said aeration of wastewater of step (c) and said solids settling in quiescent zone of step (d) occur sequentially within the same space;
   said oxidizing of wastewater of step (f) occurs intermittently; and
   said agitating of wastewater and adsorbent of step (h), settling of step (i), and separating of step (j) occur sequentially within the same space.

4. A process according to claim 1 wherein the total amount of adsorbent solids and biologically active aerobic solids present in said aeration zone is about 50 to about 50,000 parts per million of wastewater.

5. A process according to claim 4 wherein the amount of adsorbent solids present in said aeration zone is about 25 to about 20,000 parts per million of wastewater.

6. A process according to claim 1 wherein the amount of adsorbent solids present in said adsorbent contact zone is about 50 to about 50,000 parts per million of wastewater.

7. A process according to claim 1 wherein said adsorbent is activated carbon.

8. A process according to claim 1 wherein said agitation in said adsorbent contact zone is carried out by introducing a pressurized oxygen-containing gas into said contact zone.

9. A process according to claim 1 wherein said agitation in said adsorbent contact zone is carried out by mechanical agitation in said contact zone.

10. A process according to claim 1 wherein said oxidizer is chosen from a group comprising $Cl_2$, NaOCl, $KMnO_4$, $H_2O_2$, or $O_3$.

11. A process according to claim 10 wherein the amount of chlorine oxidizer used is about 50 to about 15,000 parts per million of wastewater.

12. A process according to claim 1 further comprising the step of adding to said thus-treated wastewater in step (c) a flocculation aid for promoting settling of solids in said quiescent zone of step (d).

13. A process according to claim 12 wherein said flocculation aid is a cationic polymer.

14. A process according to claim 1 further comprising the step of adding to said thus-treated aqueous phase in step (h) a flocculation aid for promoting settling of powdered adsorbent solids in said contact zone of step (i).

15. A process according to claim 14 wherein said flocculation aid is a cationic polymer.

16. A process according to claim 1 further comprising the step of transferring at least a portion of said second solids phase from said adsorbent contact zone to said primary aerobic treatment aeration zone.

17. A process according to claim 1 further comprising the step of withdrawing a portion of the powdered adsorbent solids and biologically active aerobic solids from said primary aerobic treatment zone so as to maintain the amounts of said adsorbent and biological solids present in said aeration zone at predetermined levels.

18. A process for purifying wastewater containing organic and color-causing pollutants comprising the steps:
 (a) providing a primary anaerobic treatment zone including a mixing zone and a quiescent zone for treating the wastewater;
 (b) introducing wastewater into said anaerobic mixing zone;
 (c) mixing the wastewater in said mixing zone by mixing means in the presence of sufficient amounts of powdered adsorbent solids and biologically active anaerobic solids to reduce the organic and color-causing pollutants to desired levels, said thus-treated wastewater and solids transferred from said mixing zone to said anaerobic quiescent zone;
 (d) retaining said thus-treated wastewater and solids in the quiescent zone for a sufficient time for solids therein to settle by gravity and produce a first settled solids phase and a first aqueous phase substantially free of solids;
 (e) transferring said first aqueous phase from said primary anaerobic treatment zone to an oxidizer contact zone;
 (f) contacting said first aqueous phase with a chemical oxidizer in the oxidizer contact zone for a sufficient time to remove a further portion of said organic and color-causing pollutants;
 (g) transferring said thus-treated aqueous phase from the oxidizer contact zone to an adsorbent contact zone;
 (h) agitating said thus-treated aqueous phase in the adsorbent contact zone in the presence of powdered adsorbent solids for an agitation period sufficient to further reduce the organic and color-causing pollutants to desired levels;
 (i) terminating agitation and allowing adsorbent solids in said adsorbent-treated aqueous phase to settle by gravity for a settling period sufficient to produce a clarified, substantially solids-free, second aqueous phase and a second solids phase; and
 (j) separating said second aqueous phase from said second solids phase and discharging said second aqueous phase to the environment or to further use.

19. A process according to claim 18 wherein said process operates in a continuous flow mode wherein
 said mixing of wastewater of step (c) and said solids settling in quiescent zone of step (d) occurs continuously and simultaneously;
 said oxidizing of wastewater of step (f) occurs continuously;
 and said agitating of wastewater and adsorbent of step (h), settling of step (i), and separating of step (j) occurs continuously and simultaneously.

20. A process according to claim 18 wherein said process operates in a batch flow mode wherein
 said mixing of wastewater of step (c) and said solids settling in quiescent zone of step (d) occur sequentially within the same space;
 said oxidizing of wastewater of step (f) occurs intermittently; and
 said agitating of wastewater and adsorbent of step (h), settling of step (i), and separating of step (j) occur sequentially within the same space.

21. A process according to claim 18 wherein the total amount of adsorbent solids and biologically active anaerobic solids present in said mixing zone is about 50 to about 50,000 parts per million of wastewater.

22. A process according to claim 21 wherein the amount of adsorbent solids present in said mixing zone is about 25 to about 20,000 parts per million of wastewater.

23. A process according to claim 18 wherein the amount of adsorbent solids present in said adsorbent contact zone is about 50 to about 50,000 parts per million of wastewater.

24. A process according to claim 18 wherein said adsorbent is activated carbon.

25. A process according to claim 18 wherein said agitation in said adsorbent contact zone is carried out by introducing a pressurized oxygen-containing gas into said contact zone.

26. A process according to claim 18 wherein said agitation in said adsorbent contact zone is carried out by mechanical agitation in said contact zone.

27. A process according to claim 18 wherein said oxidizer is chosen from a group comprising $Cl_2$, NaOCl, $KMnO_4$, $H_2O_2$, or $O_3$.

28. A process according to claim 27 wherein the amount of chlorine oxidizer used is about 50 to about 15,000 parts per million of wastewater.

29. A process according to claim 18 further comprising the step of adding to said thus-treated wastewater in step (c) a flocculation aid for promoting settling of solids in said quiescent zone of step (d).

30. A process according to claim 29 wherein said flocculation aid is a cationic polymer.

31. A process according to claim 18 further comprising the step of adding to said thus-treated aqueous phase in step (h) a flocculation aid for promoting settling of powdered adsorbent solids in said contact zone of step (i).

32. A process according to claim 31 wherein said flocculation aid is a cationic polymer.

33. A process according to claim 18 further comprising the step of transferring at least a portion of said second solids phase from said adsorbent contact zone to said primary anaerobic treatment mixing zone.

34. A process according to claim 18 further comprising the step of withdrawing a portion of the powdered adsorbent solids and biologically active anaerobic solids from said primary anaerobic treatment zone so as to maintain the amounts of said adsorbent and biological solids present in said mixing zone at predetermined levels.

* * * * *

UNITED STATES PATENT AND TRADEMARK OFFICE
CERTIFICATE OF CORRECTION

PATENT NO.  :  5,302,288
DATED       :  April 12, 1994
INVENTOR(S) :  John A. Meidl et al.

It is certified that error appears in the above-identified patent and that said Letters Patent is hereby corrected as shown below:

In column 3, line 6 of the Patent, delete "mod" and insert -- mode -- therefor.

In column 3, line 15 of the Patent, delete "Within" and insert -- within -- therefor.

In column 9, line 50 of the Patent, delete "so" and insert --80.-- therefor.

In column 10, line 4 of the Patent, delete "so" and insert -- 80 -- therefor.

Signed and Sealed this

Twenty-seventh Day of September, 1994

Attest:

BRUCE LEHMAN

Attesting Officer

*Commissioner of Patents and Trademarks*